United States Patent
Garrett et al.

(10) Patent No.: US 8,541,536 B2
(45) Date of Patent: Sep. 24, 2013

(54) COUPLING METHOD FOR PROVIDING HIGH MOLECULAR WEIGHT NATURAL OIL POLYOL

(75) Inventors: Thomas M. Garrett, Corona, CA (US); Xian Xian Du, Pittsburg, KS (US)

(73) Assignee: MCPU Polymer Engineering LLC, Corona, CA (US)

( * ) Notice: Subject to any disclaimer, the term of this patent is extended or adjusted under 35 U.S.C. 154(b) by 0 days.

(21) Appl. No.: 12/927,086

(22) Filed: Nov. 5, 2010

(65) Prior Publication Data
US 2011/0166315 A1 Jul. 7, 2011

Related U.S. Application Data

(60) Provisional application No. 61/335,439, filed on Jan. 7, 2010.

(51) Int. Cl.
*C08G 18/42* (2006.01)

(52) U.S. Cl.
USPC ............................ 528/74.5; 554/161; 554/172

(58) Field of Classification Search
None
See application file for complete search history.

(56) References Cited

U.S. PATENT DOCUMENTS

| | | | |
|---|---|---|---|
| 2,882,249 A | 4/1959 | Posnansky | |
| 3,485,779 A * | 12/1969 | Schneider et al. | ............... 528/85 |
| 4,025,477 A | 5/1977 | Borden et al. | |
| 4,094,838 A | 6/1978 | Schneider et al. | |
| 4,174,329 A | 11/1979 | Bell et al. | |
| 4,508,853 A | 4/1985 | Kluth et al. | |
| 4,551,517 A | 11/1985 | Herold et al. | |
| 4,742,087 A | 5/1988 | Kluth et al. | |
| 4,886,893 A | 12/1989 | Meffert et al. | |
| 5,266,714 A | 11/1993 | Stoll et al. | |
| 5,302,626 A | 4/1994 | Hoefer et al. | |
| 5,476,969 A | 12/1995 | Hinz et al. | |
| 6,107,433 A | 8/2000 | Petrovic et al. | |
| 6,121,398 A | 9/2000 | Wool et al. | |
| 6,180,686 B1 | 1/2001 | Kurth | |
| 6,433,121 B1 | 8/2002 | Petrovic et al. | |
| 6,433,125 B1 | 8/2002 | Gruetzmacher et al. | |
| 6,573,354 B1 | 6/2003 | Petrovic et al. | |
| 6,686,435 B1 | 2/2004 | Petrovic et al. | |
| 6,762,274 B2 | 7/2004 | Waddington et al. | |
| 6,891,053 B2 | 5/2005 | Chasar et al. | |
| 6,924,321 B2 | 8/2005 | Casati et al. | |
| 2006/0041157 A1 | 2/2006 | Petrovic et al. | |
| 2009/0234037 A1* | 9/2009 | Luo | ................................ 521/97 |

OTHER PUBLICATIONS de Kraker, J.W.; Schurink, M.; Franssen, M.C.R.; Konig, W. A; de Groot, A.; and Bouwmeester, H.J.. "Hydroxylation of Sesquiterpenes by Enzymes From Chicory (*Cichorium intybus* L.) Roots." *Tetrahedron*, 59(2003), pp. 409-418.

Cirino, P.C. and Arnold, F.H. . "Regioselectivity and Activity of Cytochrome P450 BM-3 and Mutant F87A in Reactions Driven by Hydrogen Peroxide." *Advance Synthetics Catalog* 344, No. 9(2002), pp. 932-937.

Groves, J.T. and Viski, P.. "Asymmetric Hydroxylation by a Chiral Iron Porphyrin." *Journal of American Chemistry Society* 111(1989), pp. 8537-8538.

Balandrian, M. F.; Klocke, J.A.; Wurtele, E.S. ; Bollinger, W.H.. "Natural Plant Chemicals: Sources of Industrial and Medicinal Materials." *Science*, 228(1985), pp. 1154-1160.

Findly, T.W.; Swern, D. and Scanlan, J.T.. "Epoxidation of Unsaturated Fatty Materials with Peracetic Acid in Glacial Acetic Acid Solution." *Journal American Chemistry Society*, vol. 67(1945), pp. 412-414.

Gast, L.E., et al. "Polyesteramides from linseed and soybean oils for protective coatings: Diisocyanate-modified polymers." Journal of the American Oil Chemists' Society, vol. 46, No. 7, Jul. 1969. Web. Jul. 8, 2009.

* cited by examiner

*Primary Examiner* — Randy Gulakowski
*Assistant Examiner* — Jeffrey Washville
(74) *Attorney, Agent, or Firm* — John C. McMahon

(57) ABSTRACT

Methods of coupling plant oil based polyols so as to synthesis high molecular weight plant oil polyols having a hydroxyl number between from about 40 to about 60. The resultant polyols may be directly reacted with polyisocyanates to produce polyurethanes.

12 Claims, No Drawings

COUPLING METHOD FOR PROVIDING HIGH MOLECULAR WEIGHT NATURAL OIL POLYOL

RELATED APPLICATIONS

This application claims benefit of U.S. Provisional Application No. 61/335,439, filed Jan. 7, 2010, the disclosure of which is hereby expressly incorporated by reference in its entirety and is hereby expressly made a portion of this application.

BACKGROUND OF THE INVENTION

The present application relates to methods of conversion of plant oils into high molecular weight natural plant oil polyols that can be used as raw materials in the manufacture of polyurethanes.

The manufacture of polyurethanes from polyisocyanates requires readily available coreactants. These coreactant materials are known in the art as polyols. Polyols may be defined as reactive substances, usually liquids, that contain at least two isocyanate-reacting groups attached to a single molecule. Such isocyanate reacting groups are also known as "active hydrogen" groups as they typically give a hydrogen atom to the isocyanate nitrogen to form a urethane. For example, an alcohol group includes an active hydrogen and reacts with isocyanate to form a urethane as shown below:

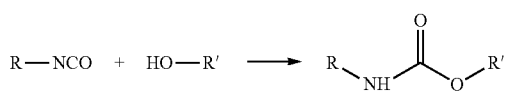

Billions of pounds of polyols are used each year to manufacture polyurethanes. Most of these polyols are polyether polyols derived from fossil fuels, typically polyethylene oxide or polypropylene oxide based polyols. As the price of oil has increased, so has the price of polyether polyols. Therefore, it has become more desirable to explore alternative sources of polyols, including agriculturally derived products such as plant oils.

Plant oils are primary metabolites of many higher plants that are economically important as sources of food and industrial oils. Chemically, plant oils are triglycerides of mixtures of fatty acids. Typically, they contain some unsaturated fatty acids. Soybean oil, for example, contains about 54 wt. % linoleic acid, 23 wt. % oleic acid, 10 wt. % palmitic acid, 8 wt. % linolenic acid and 5 wt. % stearic acid. On average, soybean oil contains 4.65 sites of unsaturation (olefin groups, carbon-carbon double bonds) per molecule. If active hydrogen functional groups, such as alcohols, are introduced into the molecule of plant oil, the product can be used as a polyol to make polyurethane.

Many plant oils, such as corn oil, soybean oil, rapeseed oil, sunflower oil, peanut oil, safflower oil, olive oil, and cotton seed oil exist in abundant supply. This abundance could yield low cost polyols if the plant oils could be functionalized with active hydrogen groups, such as alcohols, without the problems inherent in the epoxide synthetic pathway currently used in the production of most plant polyols. For example, almost all of the commercially available polyols made from soybean oil are manufactured in a two step process beginning with the epoxidation of soybean oil. Such process is well known in the art, and may be shown as follows:

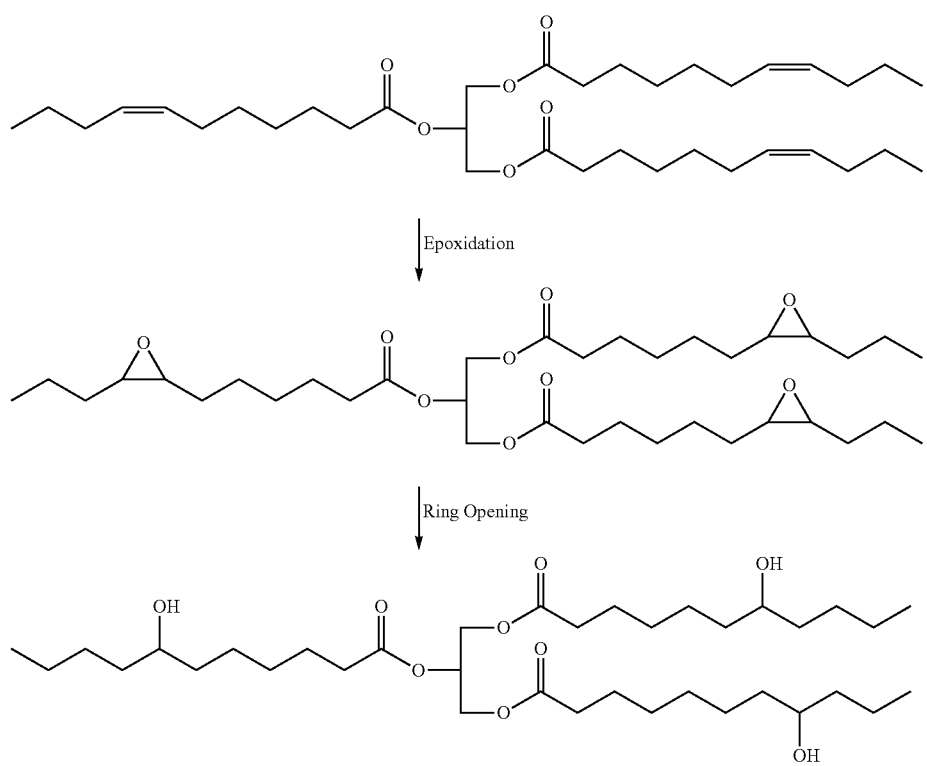

In the above-identified pathway, hydroxyl groups are introduced onto the molecule of soybean oil in the second process step by opening the oxirane of epoxidized soybean oil to form soy polyol. This may be accomplished in a variety of ways. For example, U.S. Pat. No. 2,882,249 describes the soy polyol formed by ring opening epoxidized soybean oil with ricinoleic acid. U.S. Pat. No. 4,025,477 describes the soy polyol obtained by ring opening epoxidized soybean oil with acrylic acid. U.S. Pat. Nos. 5,266,714 and 5,302,626 describe soy polyols obtained by ring opening epoxidized soybean oil with carboxylic acids. U.S. Pat. No. 6,891,053 describes the soy polyol obtained by ring opening epoxidized soybean oil with acid leached clay. U.S. Pat. Nos. 4,508,853 and 4,742,087 describe the soy polyol obtained by ring opening epoxidized soybean oil with alcohols. U.S. Pat. Nos. 6,433,125 and 4,551,517 describe soy polyols obtained by ring opening epoxidized soybean oil with higher alcohols. U.S. Pat. No. 4,886,893 describes the soy polyol obtained by ring opening epoxidized soybean oil with polyfunctional alcohols. U.S. Pat. Nos. 6,107,433, 6,433,121, 6,573,354 and 6,686,435 describe the soy polyols obtained by ring opening epoxidized soybean oil with a mixture of water, alcohol and fluoroboric acid.

Epoxidized soybean oils used to manufacture soy polyols typically have epoxide numbers of from about 4.8 to about 7.2. If the epoxide number of epoxidized soybean oil is too low, the hydroxylation reaction will give a soy polyol that contains an undesirable concentration of by-products having zero and mono hydroxy group molecules. Soy polyol containing zero and mono hydroxyl group molecules result in polyurethanes with poor physical properties. If the epoxide number of the epoxidized soybean oil is too high, the hydroxylation reaction will produce a soy polyol product that contains an undesirably large concentration of by-product having intramolecular cross-linked molecules. High concentrations of by-products containing intramolecular cross-linking unacceptably increases the viscosity of the soy polyols as well as detrimentally affecting the physical properties of the polyurethane products. It is known in the art that ring opening, for example, via hydroxylation of epoxidized plant oils, results in a variety of complex by-products, including, but not limited to intra-molecular cross-linked by-products, intermolecular cross-linked by-products, hydrolysis by-products and alcohol exchange by-products. Furthermore, even the expected or planned products of epoxidized plant oils may be poor reactors, such as secondary hydroxyl groups in the middle of fatty acid chains, which may be high in stearic hindrance.

Currently, manufacturers seeking to use plant oil polyols, such as soybean oil-derived polyols, to produce polyurethane, typically must choose between inexpensive, high viscosity raw materials that are dark in color or, alternatively, expensive, low viscosity and lighter colored materials. Products from both materials may have poor physical properties that limit market acceptance. Furthermore, such poor properties may limit the overall percentage in which such materials are added to polyurethane formulations. For many uses, preferably, a plant polyol reactant would be a low cost, low viscosity and light colored raw material comparable to certain materials derived from fossil fuels. However, because of the problems inherent in opening the epoxide ring of epoxidized plant oils, such as epoxidized soybean oil, such physical properties are not possible with the currently available technology.

It is noted that it is known in the art to hydroxylate hydrocarbons by biological methods. However, to date, known processes have proven uneconomical. Also, some plant oils can be used as polyols without modification. For example, castor oil contains on average about 2.7 hydroxyl groups per molecule. However, the supply of castor oil is limited and properties of polyurethanes made from such polyols (such as resilience) are not equal to those of fossil fuel derived materials.

Certain polyols may be derived from plant sources. For example polytetramethylene glycol (PTMEG) is derived from polymerizing tetrahydrofuran (THF) from corn. Such polyols yield polyurethanes with excellent physical properties and are thus superior raw materials. However, to date, the high cost of producing such polyols has resulted in limited market acceptance.

It is noted that Gast et al., U.S. Pat. No. 3,485,779 (hereafter the '779 patent) discloses reactions of hydroxylamines with triglycerides. Specifically that linseed and soybean N,N-bis-hydroxyalkyl fatty amides can be obtained by a strong base sodium methoxide catalyzed aminolysis of linseed oil and soybean oil. Such a reaction may be set forth as follows:

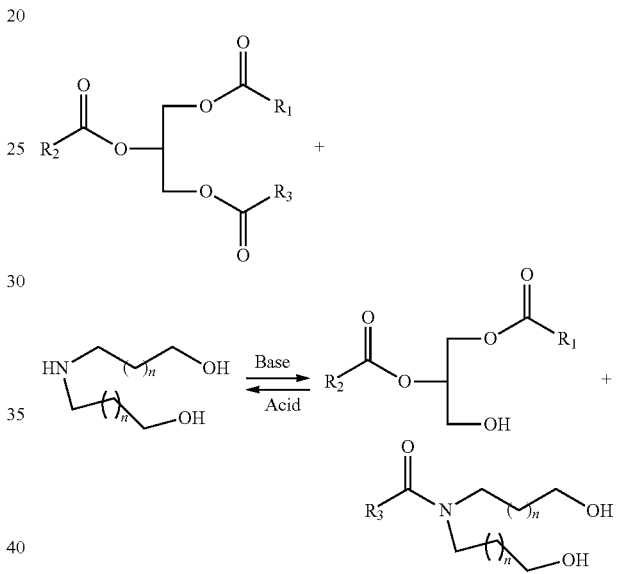

It is further noted that the '779 patent reports that reactions of that invention are inhibited by HX, thus teaching against the invention of the present application that teaches the use of HX as a catalyst in certain embodiments.

Schneider et al., U.S. Pat. No. 4,094,838 (hereafter the '838 patent) discloses soybean N,N,-bis-hydroxy ethyl fatty amide that can be used to make water-dispersible polyurethane coatings as a small molecule polyol of polyurethane resin. The '838 patent teaches diethanolamine as a preferred amidating agent in a base catalyzed aminolysis. The preferred catalyst being sodium methoxide.

SUMMARY OF THE INVENTION

In a first embodiment, a process of coupling plant oil based polyols to produce a plant oil polyol, including the steps of forming a mixture including a plant oil polyol, and a coupling reagent; and reacting the mixture at a temperature of from about 100° F. to about 250° F. while simultaneously removing water from the mixture for at least three, so as to form a plant oil based polyol with a hydroxyl number of between about 50 and 60, is provided.

In a further embodiment, the polyol product is a comparatively high molecular weight polyol and the reaction time for the mixture is in the range from 3-hours to 24-hours.

In a further embodiment, the coupling reagent is a dicarboxylic acid anhydride selected from the group consisting of ethanedioic acid anhydride, propanedioic acid anhydride, butanedioic acid anhydride, pentanedioic acid anhydride, hexanedioic acid anhydride, heptanedioic acid anhydride, octanedioic acid anhydride, nonanedioic acid anhydride, decanedioic acid anhydride, benzene-1,2-dicarboxylic acid anhydride, o-phthalic acid benzene-1,3-dicarboxylic acid anhydride, m-phthalic acid benzene-1,4-dicarboxylic acid anhydride, p-phthalic acid anhydride, and combinations thereof.

In a further embodiment, reacting the mixture includes refluxing the mixture.

In a further embodiment, the plant oil based polyol is selected from the group consisting of a corn oil polyol, soybean oil polyol, rapeseed oil polyol, sunflower oil polyol, sesame seed oil polyol, peanut oil polyol, safflower oil polyol, olive oil polyol, cotton seed oil polyol, linseed oil polyol, walnut oil polyol and tung oil polyol and combinations thereof.

In a further embodiment, the plant oil based polyol is a soybean oil polyol having a hydroxyl number of from about 50 to about 60.

In a second embodiment, a high molecular weight plant oil polyol with a hydroxyl number of between about 50 and 60 according to the process of coupling plant oil based polyols to produce a high molecular weight plant oil polyol, including the steps of forming a mixture including a plant oil based polyol, and a coupling reagent; and reacting the mixture under vacuum and at a temperature of from about 100° F. to about 250° F. for a period of from about 3-hours to about 24-hours or more, so as to form a plant oil polyol with a hydroxyl number of between about 50 and 60, is provided.

In a further embodiment, the polyol is a soybean oil based polyol.

In a third embodiment, a process of preparing a polyurethane, including the steps of reacting at least one plant oil polyol according to the process of coupling plant oil based polyols to produce a high molecular weight natural oil polyol, including the steps forming a mixture including a plant oil based polyol, and a coupling reagent; and reacting the mixture under vacuum and at a temperature of from about 100° F. to about 250° F. for a period of from about 3-hours to about 24-hours or more, so as to form a plant oil polyol with a hydroxyl number of between about 50 and 60, wherein the plant oil includes a hydroxyl number of between about 50 and 60, with an isocyanate, is provided.

In a fourth embodiment, a polyurethane according to the process of preparing a polyurethane, including the steps of reacting at least one plant oil polyol according to the process of coupling plant oil based polyols to produce a high molecular weight natural oil polyol, including the steps forming a mixture including a plant oil based polyol, and a coupling reagent; and reacting the mixture under vacuum and at a temperature of from about 100° F. to about 250° F. for a period of from about 3-hours to about 24-hours or more, so as to form a plant oil polyol with a hydroxyl number of between about 50 and 60, wherein the plant oil polyol includes a hydroxyl number of between about 50 and 60, with an isocyanate, is provided.

OBJECTS OF THE INVENTION

Not all objects apply to all embodiments. One object of the present invention is to provide a method of coupling renewable plant oil based polyols, so as to produce a higher molecular weight polyol that subsequently can be used for the synthesis of bio-based or plant oil based polyurethanes. Another object of the present invention is to provide low cost bio-based polyols with increased reactivity, lower color and less steric hindrance than other polyols.

Other objects and advantages of this invention will become apparent from the following description that sets forth, by way of illustration and example, certain embodiments of this invention.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention.

It is believed the chemistry disclosed in the present application can be applied to synthetic oils, fossil fuel and derived oils, and oils from genetically engineered plants, as well as naturally occurring plant oils and blends of any of the above oils, as long as such oils include carbon-carbon double bonds on which to carry out the reaction. Also, homologue derivatives of plant polyols according to the invention are possible. For example, polyols of the invention may be ethoxylated or propoxylated to further resemble fossil fuel polyols.

Plant oil based polyols, or natural oil or plant oil polyols, can be coupled or joined together, so as to synthesize a natural oil polyol having a high molecular weight and a low hydroxyl value or number. Preferably, the molecular weight of the high molecular weight, or coupled, polyol is greater than about 800, and more preferably in a range of about 2,000 to about 20,000, and the hydroxyl value (OHV) is 150 or less.

In an embodiment according to the invention, a process of coupling plant oil based polyols to produce a high molecular weight natural oil polyol product is provided, including the steps of forming a mixture of a plant oil based polyol reagent and a coupling reagent; and then reacting the mixture at a temperature of from about 100° F. to about 250° F. while simultaneously removing water from the mixture for a period of from about 3-hours to about 24-hours or more, so as to form a high molecular weight plant oil polyol product with a hydroxyl number, or hydroxyl value, of between about 50 and 60. In some embodiments, the high molecular weight natural oil polyol includes a hydroxyl number of between about 50 and 60.

The coupling reaction is reversible. Further, water is one of the reaction products. In order to drive the reaction towards completion of the coupling reaction, the water is removed while the reaction is proceeding. This can be done using a variety of methods known in the art. For example, the water may be removed from the mixture by refluxing the mixture over a Dean-Stark trap. In another example, the water may be removed from the mixture by reacting the mixture under a vacuum, as the hot reaction makes the water easily volatile, especially in a vacuum. Additional suitable methods are known in the art.

Numerous natural plant oil, or plant oil based, polyols are suitable polyol reagents for the synthesis of the high molecular weight plant oil polyol, including but not limited to corn oil polyol, soybean oil polyol, rapeseed oil polyol, sunflower oil polyol, sesame seed oil polyol, peanut oil polyol, safflower oil polyol, olive oil polyol, cotton seed oil polyol, linseed oil polyol, walnut oil polyol, tung oil polyol and combinations thereof.

In one embodiment, the high molecular weight natural plant oil polyol includes a soybean oil based polyol reagent having a hydroxyl value (OHV), or hydroxyl number, of 150. In another embodiment, the soybean oil based polyol reagent has a hydroxyl value (OHV) of less than 150.

The polyol reagent may be synthesized using any method disclosed herein. In preferred embodiments, the polyol reagent is a soybean oil based polyol synthesized in one step, according to the reaction scheme described above. After synthesis, the plant oil polyols, or the polyol reagent, are coupled together using a coupling reagent, according to the reaction scheme:

anhydride, benzene-1,2-dicarboxylic acid anhydride, o-phthalic acid benzene-1,3-dicarboxylic acid anhydride, m-phthalic acid benzene-1,4-dicarboxylic acid anhydride, p-phthalic acid anhydride, and combinations thereof.

In some other embodiments, the coupling reagent is a poly-alcohol. For example, coupling reagent may be a diol, a triol, a qaurtol, and combinations thereof. When the coupling reagent is a poly-alcohol, the high molecular weight polyol produced is an ether polyol.

The coupling reaction is acid catalyzed. Thus, the coupling reaction is performed in the presence of an acid. Suitable acid

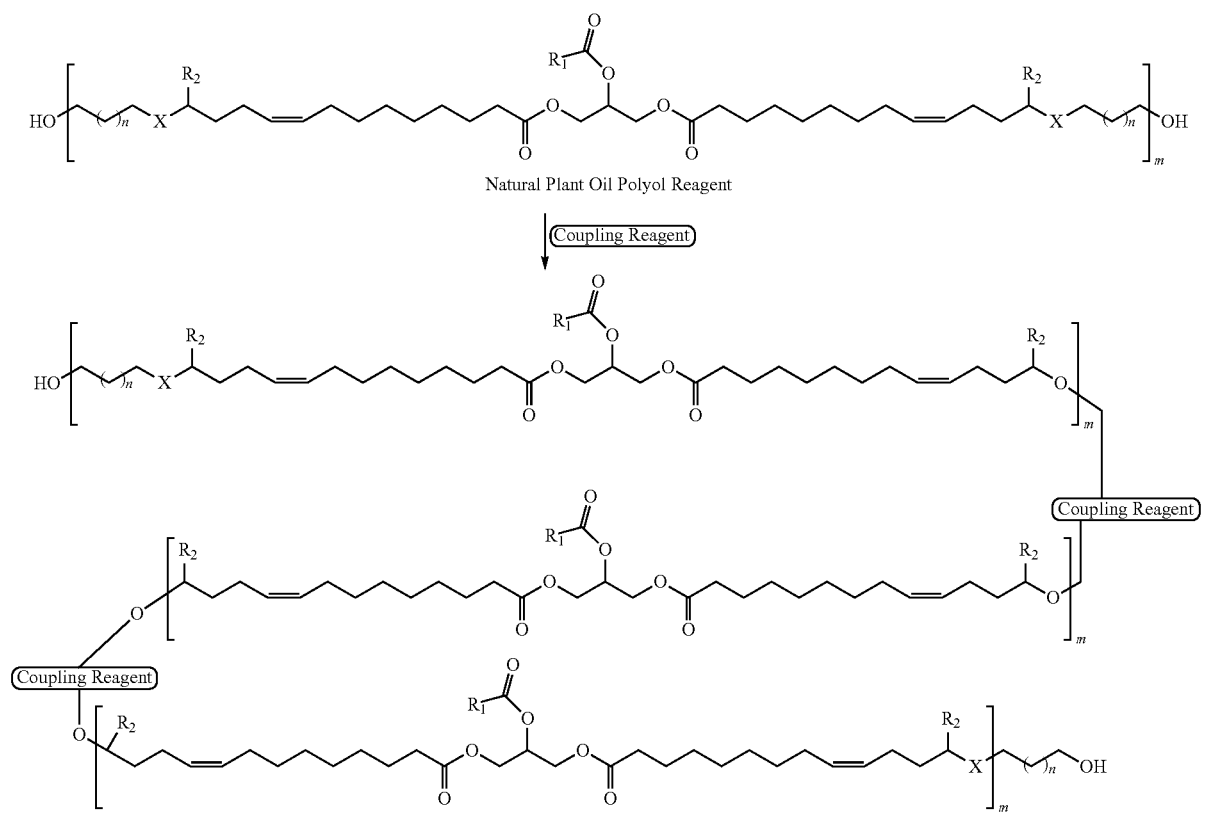

Numerous coupling reagents, agents or reactants may be used. In some embodiments, the coupling reagent is a carboxylic acid free acid or an anhydride of the acid. For example, the coupling reagent may be a dicarboxylic acid, a polycarboxylic acid, such as a tricarboxylic acid, or a combination thereof. In other examples, the coupling reagent may be an anhydride of the dicarboxylic or polycarboxylic acid. Preferably, the coupling reagent is an anhydride of an aliphatic dicarboxylic acid or an aromatic dicarboxylic acid, or a di- or tricarboxylic free acid. When the coupling reagent is a dicarboxylic or polycarboxylic acid, or an anhydride thereof, the high molecular weight polyol produced is a polyester polyol.

Some exemplary dicarboxylic acid anhydride coupling reagents include but are not limited to ethanedioic acid anhydride, propanedioic acid anhydride, butanedioic acid anhydride, pentanedioic acid anhydride, hexanedioic acid anhydride, heptanedioic acid anhydride, octanedioic acid anhydride, nonanedioic acid anhydride, decanedioic acid catalysts include, but are not limited to, phosphoric acid, sulfuric acid, p-toluensulfonic acid and methanesulfonic acid.

The coupling reaction is performed under vacuum and at a temperature of about 100° F., 105° F., 110° F., 115° F., 120° F., 125° F., 130° F., 135° F., 140° F., 145° F., 150° F., 155° F., 160° F., 165° F., 170° F., 175° F., 180° F., 185° F., 190° F., 195° F., 200° F., 205° F., 210° F., 215° F., 220° F., 225° F., 230° F., 235° F., 240° F., 245° F., 250° F., 255° F. or higher. In some circumstances, the reaction temperature is optimized for at least one of the reaction components, the reaction volume, and the reaction vessel. In some circumstances, the reaction is performed under a nitrogen gas blanket.

The coupling reaction is performed for a period of from about 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, or 24-hours or longer. In some circumstances, the reaction time is optimized for at least one of the reaction components, the reaction volume, and the reaction vessel. For example, longer reactions times, such as but not limited to 1, 2, 3, 4, 5, 6, 7, 8, 9, 10, 11, 12, 13, or 14-days may be required for larger-scale or industrial-scale reaction volumes, such as is known in the art.

In some embodiments, additional processing of the reaction mixture improves the amount and/or quality of the reaction product. For example, in some circumstances, the reaction mixture may be refluxed, extracted, distilled or the like.

In preferred embodiments, the coupled plant oil polyols may be used to synthesize plant oil based polyurethanes, such as is described elsewhere herein. Often, coupled plant oil polyol is a soybean oil based coupled polyol, wherein the polyol(s) has a hydroxyl number of from about 50 to about 60. For example, suitable soybean oil based polyols for use in the coupling reaction have a hydroxyl number of about 50, 51, 52, 53, 54, 55, 56, 57, 58, 59 or 60.

The following examples of compositions according to the invention are provided for illustration. Any parts and percentages are by weight of the composition unless otherwise indicated.

EXAMPLE 1

| Component | Amount (grams) |
| --- | --- |
| Soybean oil | 99.79 |
| Iodine | 0.17 |
| Diethanolamine | 10.78 |
| Maleic anhydride | 9.15 |
| Phosphorus pentoxide | 0.10 |
| Diphenylmethane diisocyanate | 2.70 |

The above amounts of diethanolamine and iodine were added to the above amount of soybean oil with stirring. The mixture was stirred for 23 hours at a temperature between about 195° F. (90° C.) and about 236° F. (113° C.). Then the above amounts of maleic anhydride and phosphorus pentoxide were added. The mixture was stirred for 22 hours at between about 195° F. (90° C.) and about 236° F. (113° C.) and under vacuum, then cooled to room temperature to give about 119.90 grams clear liquid soybean oil-polyol with a hydroxyl number of 58. An amount of 20.00 grams of the reaction product was then reacted with the above disclosed amount of diphenylmethane diisocyanate, yielding a solid polyurethane material based upon soybean oil.

EXAMPLE 2

| Component | Amount (grams) |
| --- | --- |
| Soybean oil | 129.86 |
| Iodine | 0.23 |
| Diethanolamine | 14.03 |
| Maleic anhydride | 15.72 |
| Phosphoric acid | 0.16 |
| Diphenylmethane diisocyanate | 00.90 |

The above amounts of diethanolamine and iodine were added to the above amount of soybean oil with stirring. The mixture was stirred for 24 hours at a temperature between about 120° F. and about 225° F. Then, the above amounts of maleic anhydride and phosphoric acid were added with stirring. The second mixture was stirred for 22 hours under vacuum, at a temperature between about 120° F. and about 225° F., then cooled to room temperature to give a liquid soy polyol with a hydroxyl number of 38. A reaction mixture of about 10.00 grams of the soybean oil based polyol with the above amount of diphenylmethane diisocyanate yielded a solid soybean oil based polyurethane material.

EXAMPLE 3

| Component | Amount (grams) |
| --- | --- |
| Soybean oil | 132.89 |
| Iodine crystal | 0.23 |
| Diethanolamine | 14.36 |
| Maleic anhydride | 12.36 |
| Phosphoric acid | 0.16 |
| Diphenylmethane diisocyanate | 1.35 |

The above amounts of diethanolamine and iodine were added to the above amount of soybean oil with stirring. The mixture was stirred for 23 hours at a temperature between about 190° F. and about 226° F. Then, the above amounts of maleic anhydride and phosphoric acid were added with stirring. The mixture was stirred under vacuum for 24 hours at between about 190° F. and about 226° F. to give a liquid soybean oil based polyol with a hydroxyl number of 57. A reaction mixture of about 10.00 grams of the polyol and the above indicated amount of diphenylmethane diisocyanate yielded a solid soybean oil based polyurethane material.

EXAMPLE 4

| Component | Amount (grams) |
| --- | --- |
| Soybean oil | 116.16 |
| Iodine crystal | 0.20 |
| Diethanolamine | 12.55 |
| Maleic anhydride | 10.97 |
| Phosphoric acid | 0.16 |
| Diphenylmethane diisocyanate | 1.30 |

The above amounts of diethanolamine and iodine were added to the above amount of soybean oil with stirring. The mixture was stirred for 23 hours at a temperature between about 180° F. and about 225° F. Then, the above amounts of maleic anhydride and phosphoric acid were added with stirring. The mixture was stirred under vacuum for 23 hours at between about 190° F. and about 226° F. to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

EXAMPLE 5

| Component | Amount (grams) |
| --- | --- |
| Soybean oil | 124.64 |
| Iodine crystal | 0.22 |
| Diethanolamine | 13.47 |
| Maleic anhydride | 21.56 |
| Toluene | 200.00 |

-continued

| Component | Amount (grams) |
|---|---|
| Sulfuric acid | 0.12 |
| Diphenylmethane diisocyanate | 1.26 |

The above amounts of diethanolamine and iodine were added to the above amount of soybean oil with stirring. The mixture was stirred for 22 hours at a temperature between about 180° F. and about 225° F. Then, the above amounts of maleic anhydride, toluene and sulfuric acid were added with stirring. The mixture was refluxed for 6 hours using a Dean-Stark distilling trap, then distilled out of solvent to give a liquid soybean oil based polyol with a hydroxyl number of 50. A reaction mixture of about 10.00 grams of the polyol and the above indicated amount of diphenylmethane diisocyanate yielded a solid soybean oil based polyurethane material.

EXAMPLE 6

| Component | Amount (grams) |
|---|---|
| Soybean oil | 124.18 |
| Iodine crystal | 0.22 |
| Diethanolamine | 13.42 |
| Maleic anhydride | 12.03 |
| Toluene | 200.00 |
| Phosphoric acid | 0.15 |
| Diphenylmethane diisocyanate | 1.28 |

The above amounts of diethanolamine and iodine were added to the above amount of soybean oil with stirring. The mixture was stirred for 23 hours at a temperature between about 180° F. and about 227° F. Then, the above amounts of maleic anhydride, toluene and phosphoric acid were added with stirring. The mixture was refluxed for 8 hours using a Dean-Stark distilling trap, then distilled out of solvent to give a liquid soybean oil based polyol with a hydroxyl number of 52. A reaction mixture of about 10.00 grams of the polyol and the above indicated amount of diphenylmethane diisocyanate yielded a solid soybean oil based polyurethane material.

EXAMPLE 7

| Component | Amount (grams) |
|---|---|
| Soybean oil | 132.75 |
| Iodine crystal | 0.23 |
| Diethanolamine | 14.35 |
| Maleic anhydride | 12.54 |
| Phosphoric acid | 0.13 |
| Diphenylmethane diisocyanate | 1.32 |

The above amounts of diethanolamine and iodine were added to the above amount of soybean oil with stirring. The mixture was stirred for 24 hours at a temperature between about 190° F. and about 225° F. Then, the above amounts of maleic anhydride and phosphoric acid were added with stirring. The mixture was stirred for 10 hours at a temperature of about 240° F. under vacuum to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

EXAMPLE 8

| Component | Amount (grams) |
|---|---|
| Soybean oil | 149.34 |
| Iodine crystal | 0.26 |
| Diethanolamine | 16.14 |
| Maleic anhydride | 14.11 |
| Phosphoric acid | 0.15 |
| Diphenylmethane diisocyanate | 1.30 |

The above amounts of diethanolamine and iodine were added to the above amount of soybean oil with stirring. The mixture was stirred for 24 hours at a temperature between about 190° F. and about 225° F. Then, the above amounts of maleic anhydride and phosphoric acid were added with stirring. The mixture was stirred for 5 hours at a temperature of about 255° F. under vacuum to give a liquid soybean oil based polyol with a hydroxyl number of 52. A reaction mixture of about 10.00 grams of the polyol and the above indicated amount of diphenylmethane diisocyanate yielded a solid soybean oil based polyurethane material.

EXAMPLE 9

| Component | Amount (grams) |
|---|---|
| Soybean oil | 165.98 |
| Iodine crystal | 0.29 |
| Diethanolamine | 17.94 |
| Maleic anhydride | 15.68 |
| Phosphoric acid | 0.11 |
| Diphenylmethane diisocyanate | 1.29 |

The above amounts of diethanolamine and iodine were added to the above amount of soybean oil with stirring. The mixture was stirred for 24 hours at a temperature between about 190° F. and about 226° F. Then, the above amounts of maleic anhydride and phosphoric acid were added with stirring. The mixture was stirred for 4 hours at a temperature of about 240° F. under vacuum to give a liquid soybean oil based polyol with a hydroxyl number of 51. A reaction mixture of about 10.00 grams of the polyol and the above indicated amount of diphenylmethane diisocyanate yielded a solid soybean oil based polyurethane material.

EXAMPLE 10

| Component | Amount (grams) |
|---|---|
| Soybean oil | 165.98 |
| Iodine crystal | 0.29 |
| Diethanolamine | 17.94 |
| Maleic anhydride | 15.68 |
| Phosphoric acid | 0.11 |
| Diphenylmethane diisocyanate | 1.29 |

The above amounts of diethanolamine and iodine were added to the above amount of soybean oil with stirring. The mixture was stirred for 24 hours at a temperature between about 190° F. and about 226° F. Then, the above amounts of maleic anhydride and phosphoric acid were added with stirring. The mixture was stirred for 4 hours at a temperature of about 240° F. under vacuum to give a liquid soybean oil based polyol with a hydroxyl number of 51. A reaction mixture of about 10.00 grams of the polyol and the above indicated amount of diphenylmethane diisocyanate yielded a solid soybean oil based polyurethane material.

EXAMPLE 11

| Component | Amount (grams) |
| --- | --- |
| Soybean oil | 125.32 |
| Iodine crystal | 0.23 |
| Diethanolamine | 17.45 |
| Maleic anhydride | 16.89 |
| Phosphoric acid | 0.12 |
| Diphenylmethane diisocyanate | 1.28 |

The above amounts of diethanolamine and iodine were added to the above amount of soybean oil with stirring. The mixture was stirred for 24 hours at a temperature between about 200° F. and about 227° F. Then, the above amounts of maleic anhydride and phosphoric acid were added with stirring. The mixture was stirred for 24 hours at a temperature between about 200° F. and about 227° F. under vacuum to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

EXAMPLE 12

| Component | Amount (grams) |
| --- | --- |
| Soybean oil | 140.99 |
| Iodine crystal | 0.25 |
| Diethanolamine | 17.45 |
| Maleic anhydride | 19.00 |
| Toluene | 200.00 |
| Sulphuric acid | 0.13 |
| Diphenylmethane diisocyanate | 1.25 |

The above amounts of diethanolamine and iodine were added to the above amount of soybean oil with stirring. The mixture was stirred for 22 hours at a temperature between about 180° F. and about 225° F. Then, the above amounts of maleic anhydride, toluene and sulfuric acid were added with stirring. The mixture was refluxed for 8 hours using a Dean-Stark distilling trap, then distilled out of solvent to give a liquid soybean oil based polyol with a hydroxyl number of 53. A reaction mixture of about 10.00 grams of the polyol and the above indicated amount of diphenylmethane diisocyanate yielded a solid soybean oil based polyurethane material.

EXAMPLE 13

| Component | Amount (grams) |
| --- | --- |
| Soybean oil | 148.76 |
| Iodine crystal | 0.27 |
| Diethanolamine | 20.71 |
| Maleic anhydride | 20.05 |
| Toluene | 200.00 |
| p-Toluenesulphonic acid | 0.22 |
| Diphenylmethane diisocyanate | 1.24 |

The above amounts of diethanolamine and iodine were added to the above amount of soybean oil with stirring. The mixture was stirred for 22 hours at a temperature between about 180° F. and about 228° F. Then, the above amounts of maleic anhydride, toluene and p-toluenesulphonic acid were added with stirring. The mixture was refluxed for 10 hours using a Dean-Stark distilling trap, then distilled out of solvent to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

EXAMPLE 14

| Component | Amount (grams) |
| --- | --- |
| Soybean oil | 157.99 |
| Iodine crystal | 0.28 |
| Diethanolamine | 17.07 |
| Maleic anhydride | 14.48 |
| p-Toluenesulphonic acid | 0.18 |
| Diphenylmethane diisocyanate | 1.26 |

The above amounts of diethanolamine and iodine were added to the above amount of soybean oil with stirring. The mixture was stirred for 24 hours at a temperature between about 200° F. and about 226° F. Then, the above amounts of maleic anhydride and p-toluenesulphonic acid were added with stirring. The mixture was stirred under vacuum for 20 hours at a temperature between about 200° F. and about 226° F. to give a liquid soybean oil based polyol with a hydroxyl number of 55. A reaction mixture of about 10.00 grams of the polyol and the above indicated amount of diphenylmethane diisocyanate yielded a solid soybean oil based polyurethane material.

EXAMPLE 15

| Component | Amount (grams) |
| --- | --- |
| Soybean oil | 164.23 |
| Iodine crystal | 0.29 |
| Diethanolamine | 17.75 |
| Maleic anhydride | 16.57 |
| Methylpropane diol | 0.97 |
| Phosphoric acid | 0.20 |
| Diphenylmethane diisocyanate | 1.25 |

The above amounts of diethanolamine and iodine were added to the above amount of soybean oil with stirring. The mixture was stirred for 23 hours at a temperature between about 200° F. and about 226° F. Then, the above amounts of maleic anhydride, methylpropane diol, and phosphoric acid were added with stirring. The mixture was stirred under vacuum for 8 hours at a temperature between about 200° F. and about 230° F. to give a liquid soybean oil based polyol with a hydroxyl number of 53. A reaction mixture of about 10.00 grams of the polyol and the above indicated amount of diphenylmethane diisocyanate yielded a solid soybean oil based polyurethane material.

EXAMPLE 16

| Component | Amount (grams) |
|---|---|
| Soybean oil | 172.52 |
| Iodine crystal | 0.30 |
| Diethanolamine | 18.64 |
| Maleic anhydride | 17.40 |
| Methylpropane diol | 1.02 |
| Phosphoric acid | 0.12 |
| Diphenylmethane diisocyanate | 1.25 |

The above amounts of diethanolamine and iodine were added to the above amount of soybean oil with stirring. The mixture was stirred for 23 hours at a temperature between about 200° F. and about 227° F. Then, the above amounts of maleic anhydride, methylpropane diol, and phosphoric acid were added with stirring. The mixture was stirred under vacuum for 5 hours at a temperature between about 200° F. and about 235° F. to give a liquid soybean oil based polyol with a hydroxyl number of 53. A reaction mixture of about 10.00 grams of the polyol and the above indicated amount of diphenylmethane diisocyanate yielded a solid soybean oil based polyurethane material.

EXAMPLE 17

| Component | Amount (grams) |
|---|---|
| Soybean oil | 160.73 |
| Iodine crystal | 0.28 |
| Diethanolamine | 17.37 |
| Maleic anhydride | 18.13 |
| Diethylene glycol | 3.19 |
| P-Toluenesulfonic acid | 0.30 |
| Diphenylmethane diisocyanate | 1.26 |

The above amounts of diethanolamine and iodine were added to the above amount of soybean oil with stirring. The mixture was stirred for 23 hours at a temperature between about 210° F. and about 226° F. Then, the above amounts of maleic anhydride, diethylene glycol, and p-toluenesulfonic acid were added with stirring. The mixture was stirred under vacuum for 8 hours at a temperature between about 210° F. and about 230° F. to give a liquid soybean oil based polyol with a hydroxyl number of 55. A reaction mixture of about 10.00 grams of the polyol and the above indicated amount of diphenylmethane diisocyanate yielded a solid soybean oil based polyurethane material.

EXAMPLE 18

| Component | Amount (grams) |
|---|---|
| Soybean oil | 163.60 |
| Iodine crystal | 0.29 |
| Diethanolamine | 17.68 |
| Maleic anhydride | 16.50 |
| Diethylene glycol | 1.62 |
| P-Toluenesulfonic acid | 0.31 |
| Diphenylmethane diisocyanate | 1.25 |

The above amounts of diethanolamine and iodine were added to the above amount of soybean oil with stirring. The mixture was stirred for 23 hours at a temperature between about 210° F. and about 225° F. Then, the above amounts of maleic anhydride, diethylene glycol, and p-toluenesulfonic acid were added with stirring. The mixture was stirred under vacuum for 5 hours at a temperature between about 215° F. and about 235° F. to give a liquid soybean oil based polyol with a hydroxyl number of 54. A reaction mixture of about 10.00 grams of the polyol and the above indicated amount of diphenylmethane diisocyanate yielded a solid soybean oil based polyurethane material.

The above description discloses several methods and materials of the present invention. Variations of the methods and materials, as well as alterations in the equipment may be utilized in accordance with the invention and the described examples are not intended to limit the scope of the invention. Such variations will become apparent to those skilled in the art from a consideration of this disclosure or practice of the invention disclosed herein. Consequently, it is not intended that this invention be limited to the specific embodiments disclosed herein, but that it cover all variations, modifications and alternatives coming within the true scope and spirit of the invention. It is to be understood that while certain forms of the present invention have been illustrated and described herein, it is not to be limited to the specific forms or configuration of equipment described and shown.

All references cited herein, including but not limited to published and unpublished applications, patents, and literature references, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

What is claimed and desired to be secured by Letters Patent is as follows:

1. A process of coupling plant oil based polyols together to produce a plant oil polyol having an increased molecular weight, the process comprising:

a) forming a mixture including a low molecular weight plant oil polyol having a structure according to scheme (I)

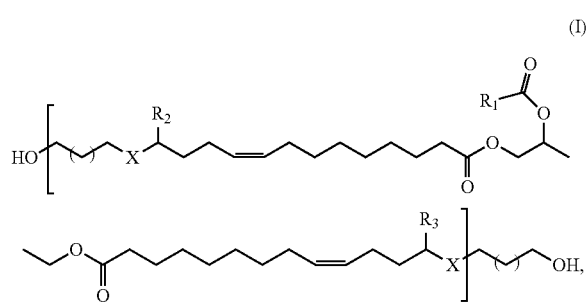

(I)

R$_1$: hydrocarbon chain of linoleic acid, or oleic acid, or palmitic acid, or linolenic acid, or stearic acid.
R$_2$: pentyl, octyl, butyl groups.
R$_3$: octyl, pentyl, butyl groups.
X: N, S, O, ...

and an anhydride coupling reagent; and b) reacting the mixture at a temperature of from about 100° F. to about 250° F. while simultaneously removing water from the mixture for at least three hours, so as to form a plant oil based product polyol having a structure according to scheme (II)

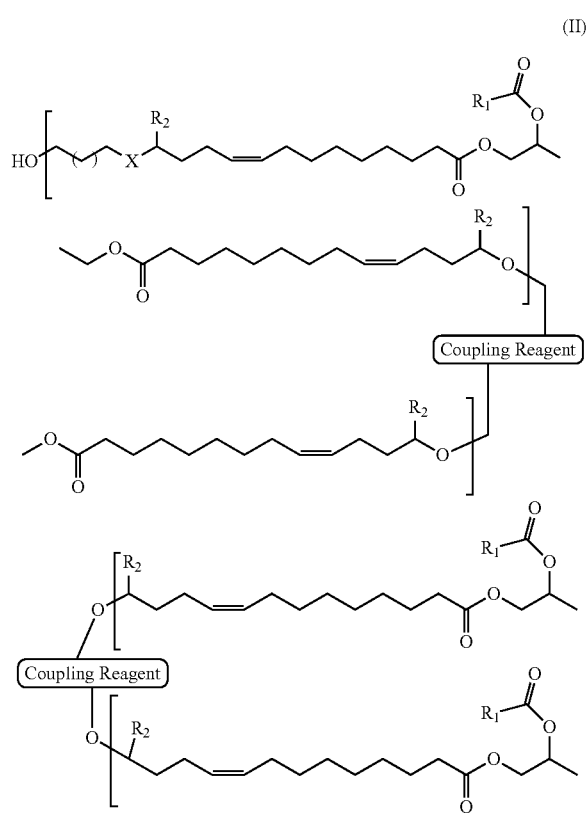

(II)

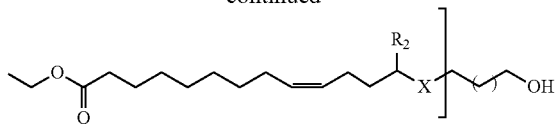

and with a hydroxyl number of between about 50 and 60.

2. The process of claim 1 wherein:
 a) the reaction is performed in the presence of an acid catalyst; and
 b) the polyol product is a comparatively high molecular weight polyol and the reaction time for the mixture is in the range from 3-hours to 24-hours.

3. The process of claim 1 wherein:
 a) the reaction is performed in the presence of an acid catalyst; and
 b) the coupling reagent is selected from the group consisting of dicarboxylic acid anhydrides, polycarboxylic acid anhydrides, and combinations thereof.

4. The process of claim 1 wherein:
 a) the reaction is performed in the presence of an acid catalyst; and
 b) the coupling reagent is selected from the group consisting of diols, triols, quartols, and combinations thereof.

5. The process of claim 1 wherein:
 a) the reaction is performed in the presence of an acid catalyst; and
 b) removing water from the mixture includes refluxing the mixture over a Dean-Stark trap.

6. The process of claim 1 wherein:
 a) the reaction is performed in the presence of an acid catalyst; and
 b) removing water from the mixture includes reacting the mixture under a vacuum.

7. The process of claim 1 wherein:
 a) the reaction is performed in the presence of an acid catalyst; and
 b) the plant oil based polyol is selected from the group consisting of a corn oil polyol, soybean oil polyol, rapeseed oil polyol, sunflower oil polyol, sesame seed oil polyol, peanut oil polyol, safflower oil polyol, olive oil polyol, cotton seed oil polyol, linseed oil polyol, walnut oil polyol, tung oil polyol and combinations thereof.

8. The process of claim 1 wherein:
 a) the reaction is performed in the presence of an acid catalyst; and
 b) the plant oil based polyol is a soybean oil polyol having a hydroxyl number of from about 50 to about 60.

9. A high molecular weight plant oil based polyol with a hydroxyl number of between about 50 and 60 according to claim 1.

10. The polyol of claim 9, wherein the polyol is a soybean oil based polyol.

11. A process of preparing a polyurethane comprising the steps of:
 a) reacting at least one plant oil based product polyol of claim 1, wherein the plant oil based product polyol includes a hydroxyl number of between about 50 and 60, with an isocyanate.

12. A polyurethane according to claim 11.

* * * * *